UNITED STATES PATENT OFFICE.

FREDERICK A. FELDKAMP, OF NEWARK, NEW JERSEY.

PROCESS OF MAKING OXALIC ACID, &c.

No. 802,980.      Specification of Letters Patent.      Patented Oct. 31, 1905.

Application filed December 8, 1904. Serial No. 235,999.

*To all whom it may concern:*

Be it known that I, FREDERICK A. FELDKAMP, a citizen of the United States, residing at Newark, in the county of Essex and State of New Jersey, have invented certain new and useful Improvements in Processes of Producing Oxalates and Oxalic Acid; and I do hereby declare the following to be a full, clear, and exact description of the invention, such as will enable others skilled in the art to which it appertains to make and use the same.

The present invention has reference to a novel process of combining a mixture of carbon-monoxid and carbon-dioxid, with an alkaline hydrate to produce an oxalate and carbonate and an intermediate production of formate and carbonate, and finally to produce oxalic acid and calcium sulfate out of the mixture of oxalate and carbonate.

This invention has reference, furthermore, to a novel process of combining water-gas, producer-gas, or the like, the essential component parts of which are carbon-monoxid and carbon-dioxid, with an alkaline hydrate to produce principally oxalic acid, but also for the purpose of producing an oxalate and carbonate.

The invention has for its principal objects to produce the above-mentioned products in a most simple, efficient, and economical manner without the separation of the carbon-monoxid from the carbon-dioxid in their original composition of the initial gas or gases used during my novel process and without having first to purify the carbon-monoxid.

The invention consists, therefore, in the novel process of producing oxalic acid as a final result, and in the intermediate production of other substances, substantially as will hereinafter appear.

The method of operation and process may be briefly described as follows: Since oxalic acid is a combination of carbon with hydrogen and oxygen, the said substance carbon is taken as the base or starting substance of my novel process. That the process may be a simple and economical one the carbon has to be transferred into such a compound, which can be produced technically with the greatest of ease; but at the same time this compound must be able to be combined with other substances required to bring forth the results desired of my present invention. The best and most satisfactory carbon compound for the purposes of the process set forth in this invention is carbon-monoxid, preferably in excess, which possesses the necessary requirements, because it can be manufactured abundantly at a small cost, and, furthermore, it has the most desirable chemical properties for the purposes of obtaining the results by means of the novel process hereinafter set forth. It will be understood, however, that there may be other carbon compounds suitable for the purposes of this invention.

The preferred carbon compounds to be used are the so-called "water-gas," "producer-gas," "Siemens gas," containing as essentials carbon-monoxid and carbon-dioxid, or, if desired, I may use a mixture of carbon-monoxid and carbon-dioxid with an alkaline hydrate for the purposes to be hereinafter more fully set forth. With the use of water-gas I am enabled to use about thirty-five to forty per cent. of the carbon-monoxid, two to ten per cent. of the carbon-dioxid, and the balance of hydrogen. My principal reasons for employing a mixture of these two gases—namely, carbon-monoxid and carbon-dioxid—to produce with the formate a carbonate are briefly the following: It has been found in practice that by heating the formate of an alkali alone its conversion into an oxalate is incomplete and a low efficiency is the result. Its manufacture on a commercial scale, therefore, is not practical and cannot be considered. The reason for this low efficiency is that at a temperature of about 360° centigrade the formate of an alkali is directly converted into a carbonate; but after having passed this temperature and especially at a temperature of from 400° to 440° centigrade the formate is converted into an oxalate. Heretofore the task of others has been to heat the formate of an alkali quickly and with the greatest rapidity in order to pass the critical temperature in the shortest possible time, and thereby reduce the losses to a minimum, or, in other words, making such losses as small as possible. It will readily be understood, however, that it is a difficult problem, and it is hardly possible to thoroughly heat the material in bulk, to provide a success upon a commercial basis in such a short time that there will be no losses, and the consequent result will be that there will be considerable loss. It is known that the addition of carbonate of soda to the formate has the effect of at once raising the efficiency of conversion into an oxalate; but since this carbonate is mixed mechanically with the formate extra expense of production and heat losses also occur, not to say anything of depending upon the variations in the market values of an artificial product, such as carbonate of soda. I have by my novel process overcome these objectionable features, and I produce a much higher efficiency without any additional labor and without any heat losses. I accomplish these results by producing the required carbonate at the same time with the formate by conducting the carbon-monoxid and mixed therewith a necessary quantity of carbon-dioxid into the alkaline hydrate at the required temperature best for the combination of the carbon-monoxid with the alkaline hydrate to produce alkaline formate. At the same time, dependent upon the quantity of carbonic acid present in the combined gases, carbonate of soda is formed, which is then in intimate and finely-divided contact with the formate.

Since water-gas or producer-gas is a mixture of carbon-monoxid, carbon-dioxid, and hydrogen or nitrogen, the carbon-monoxid prevailing, there will be sufficient of the carbon-dioxid for the purpose above stated, that the combined gases may be used in their original composition or state. I therefore avoid the removal of the hydrogen or nitrogen, which will pass through the steps of conversion without any reaction whatever, and, furthermore, I do away with the extraction of the carbon-dioxid, absolutely necessary in making a pure formate. After this combination of the carbon-monoxid and carbon-dioxid with the alkaline hydrate has been completed, as above stated, the temperature of the product, which is still retained in the same vessel, is raised to about 400° to 440° centigrade until a generation of hydrogen proceeds with uniform regularity. After the generation of the hydrogen ceases the resulting product is an oxalate in combination with a carbonate. This mixture of an oxalate with a carbonate, in this instance potassium, is boiled with slaked lime, whereupon it is converted into calcium oxalate and calcium carbonate in the respective proportions that these constituents were present in the mixture, at the same time alkaline hydrate being reproduced. After the separation of the mixture of calcium oxalate with the calcium carbonate from the alkaline hydrate sulfuric acid is added to said mixture, and the same is decomposed into oxalic acid and calcium sulfate, the carbon-dioxid being at the same time evolved thereby. The formate decomposes at the lower temperature as follows: $2KCOOH = K_2CO_3 + CO + H_2$, which proves that carbonate has been formed, and then at the higher temperature the $2KCOOH$ is decomposed in the following manner: $2KCOOH = K_2C_2O_4 + H_2$. This reaction, however, only takes place after some carbonate has been formed, with which the liberated carbon-monoxid in *status nascendi* combines to form an oxalate, thus $K_2CO_3 + CO = K_2C_2O_4$. It may be assumed, therefore, that the formate is always decomposed into carbonate and carbon-monoxid and that the latter then combines in *status nascendi* with the carbonate to form oxalate. Therefore the reaction is greatly facilitated by having the carbonate present with which the monoxid combines and which would otherwise escape and which accounts for the losses in those processes where there is no carbonate. It will be evident that the finer and more intimate the mixture of the carbonate and the formate the less opportunity is there for the escape of the carbon-monoxid.

It will clearly be evident that by the very process which produces the formate I also manufacture the carbonate, and since this is accomplished by using the same salt with which the carbon-monoxid is to be combined and with the aid of a gas which would otherwise have to be removed it will be understood that the process herein described is most simple and economical, the more so since the carbonate is later on reconverted into an alkaline hydrate. Furthermore, I do not have to extract the carbon-monoxid as heretofore; but I use the gases in their original state just as they are, because a small proportion only of the carbonate is required. Furthermore, I do not separate the mixture of oxalate and carbonate, as by doing so I avoid the losses, and I again regain by leaving the mixture together the caustic alkali during the course or steps of the process itself, which otherwise would have to be reproduced separately.

My novel process may be illustrated by the following: I fill a vessel, preferably of tubular form and located horizontally, to about one-third of the available space with caustic alkali. The ends of this vessel or pipe or tubing are closed, and in the lower portion of this vessel is a suitable revolving stirrer. At the upper part of each end there is a gas inlet and an outlet, respectively, and in the middle there is a large opening for filling or emptying purposes, and which can be closed hermetically. Instead of the stirrer the whole container may be revolved, in which case the gas inlet and outlet pipes are in the center of the end caps of the vessel, serving at the same time as bearings. The tubular vessel is then filled with, say, one hundred and seven pounds of caustic soda. After having closed the central opening the gas-inlet pipe is brought into communication with a gasometer, containing about nine hundred and fifty cubic feet of carbon monoxid, thirty-two cubic feet of carbon dioxid, one thousand cubic feet of hydrogen, and a little nitrogen. This gas, which we might call "water-gas," is conducted slowly over the caustic alkali, the temperature of which has been raised to about 220° centigrade, and the stirring device set in operation. Communication is established at the other end of the vessel with another and empty gasometer. The carbon monoxid and carbon dioxid are gradually absorbed and conducted to said second gasometer. Should it be found that after one operation there is still some of the carbon monoxid left, then the gases now in the second gasometer are again conducted into the said vessel and slowly over the alkali to the first gasometer, and so on until the original volume of the mixed gases is decreased to about one-half, which indicates that about all the alkali has been converted into one hundred and seventy pounds of sodium formate and about nine pounds of sodium carbonate. The supply of gas is now shut off, the temperature raised to about 400° to 440° centigrade, after having made connection either with the open air or with another empty gasometer to save the hydrogen now being evolved. When the generation of the hydrogen ceases, the product has been converted into one hundred and sixty-seven pounds of sodium oxalate mixed with about nine pounds of sodium carbonate, which product is then removed from the vessel to be boiled with about one hundred pounds of slaked lime, whereby about one hundred and fifty-nine pounds of calcium oxalate, eight and one-half pounds of calcium carbonate, and one hundred and seven pounds of sodium hydrate are formed. The mixture of one hundred and fifty-nine pounds of calcium oxalate and eight and one-half pounds of calcium carbonate is then treated with about one hundred and thirty-nine pounds of sulfuric acid, the final result obtained being about one hundred and fifty-six pounds of oxalic acid with two molecules of water and about one hundred and seventy pounds of calcium sulfate.

Having thus described my invention, what I claim is—

1. The process of producing oxalates and oxalic acid which consists in bringing a mechanical mixture of the oxygen compounds of carbon in combination with an alkaline hydrate, producing a mechanical mixture of formate and carbonate, and decomposing the said formate into carbonate and carbon-monoxid to produce an oxalate, substantially as set forth.

2. The process of producing oxalates and oxalic acid which consists in bringing a mechanical mixture of the oxygen compounds of carbon in combination with an alkaline hydrate, and producing a mechanical mixture of an oxalate and carbonate, substantially as set forth.

3. The process of producing oxalates and oxalic acid which consists in bringing a mechanical mixture of the oxygen compounds of carbon in combination with an alkaline hydrate, producing a mechanical mixture of calcium oxalate and calcium carbonate, and then reproducing an alkaline hydrate, substantially as set forth.

4. The process of producing oxalates and oxalic acid which consists in bringing a mechanical mixture of the oxygen compounds of carbon in combination with an alkaline hydrate, producing a mechanical mixture of calcium carbonate and calcium oxalate, reproducing an alkaline hydrate, and by the addition of sulfuric acid to said mixture of calcium oxalate and calcium carbonate producing oxalic acid and calcium sulfate, substantially as set forth.

5. The process of producing oxalates and oxalic acid which consists in bringing a mixture of carbon-monoxid and carbon-dioxid known as water-gas or reproducer-gas, in combination with an alkaline hydrate, and producing a mechanical mixture of formate and a carbonate and decomposing the formate into carbonate and carbon-monoxid to produce an oxalate, substantially as set forth.

6. The process of producing oxalates and oxalic acid which consists in bringing a mixture of carbon-monoxid and carbon-dioxid known as water-gas or producer-gas, in combination with an alkaline hydrate, the carbon-monoxid being in excess, and producing a mechanical mixture of formate and carbonate and decomposing the formate into carbonate and carbon-monoxid to produce an oxalate, substantially as set forth.

7. The process of producing oxalates and oxalic acid which consists in bringing a mixture of carbon-monoxid and carbon-dioxid known as water-gas or producer-gas, in combination with an alkaline hydrate, and producing a mechanical mixture of oxalate and carbonate, substantially as and for the purposes set forth.

8. The process of producing oxalates and oxalic acid which consists in bringing a mixture of carbon-monoxid and carbon-dioxid known as water-gas or producer-gas, in combination with an alkaline hydrate, forming a mechanical mixture of calcium oxalate and calcium carbonate, and reproducing an alkaline hydrate, substantially as set forth.

9. The process of producing oxalates and oxalic acid which consists in bringing a mixture of carbon-monoxid and carbon-dioxid known as water-gas or producer-gas, in combination with an alkaline hydrate, forming a mechanical mixture of calcium oxalate and calcium carbonate, reproducing an alkaline hydrate, and by the addition of sulfuric acid to said mixture of calcium oxalate and calcium carbonate producing oxalic acid and calcium sulfate, substantially as set forth.

10. The process of producing oxalates and oxalic acid which consists in bringing a mixture of carbon-monoxid and carbon-dioxid known as water-gas or producer-gas, in combination with caustic alkali and producing a mechanical mixture of an alkaline formate and an alkaline carbonate, heating this mixture, and producing an alkaline oxalate combined with an alkaline carbonate, substantially as set forth.

11. The process of producing oxalates and oxalic acid which consists in bringing a mixture of carbon-monoxid and carbon-dioxid known as water-gas or producer-gas, in combination with caustic alkali and producing a mechanical mixture of an alkaline formate and an alkaline carbonate, heating this mixture, and producing an alkaline oxalate combined with an alkaline carbonate, then boiling the alkaline oxalate and alkaline carbonate with slaked lime, and producing calcium oxalate and calcium carbonate and an alkaline hydrate, substantially as set forth.

12. The process of producing oxalates and oxalic acid which consists in bringing a mixture of carbon-monoxid and carbon-dioxid known as water-gas or producer-gas, in combination with caustic alkali and producing a mechanical mixture of an alkaline formate and an alkaline carbonate, heating this mixture, and producing an alkaline oxalate combined with an alkaline carbonate, then boiling the alkaline oxalate and alkaline carbonate with slaked lime, and producing calcium oxalate and calcium carbonate and an alkaline hydrate, decomposing the calcium oxalate and calcium carbonate with sulfuric acid, and producing oxalic acid and sulfate of calcium, substantially as set forth.

13. The process of producing oxalates and oxalic acid which consists in bringing a mechanical mixture of carbon-monoxid and carbon-dioxid known as water-gas or producer-gas, in combination with alkaline hydrate, heating the same and producing a mechanical mixture of alkaline formate and carbonate of soda, then again heating the same to a greater degree of heat until the generation of hydrogen ceases, and producing a mixture of oxalate and carbonate, substantially as set forth.

14. The process of producing oxalates and oxalic acid which consists in bringing a mechanical mixture of carbon-monoxid and carbon-dioxid known as water-gas or producer-gas, in combination with alkaline hydrate, heating the same and producing a mechanical mixture of alkaline formate and carbonate of soda, then again heating the same to a greater degree of heat until the generation of hydrogen ceases, adding slaked lime and producing a mechanical mixture of calcium oxalate and calcium carbonate, substantially as set forth.

15. The process of producing oxalates and oxalic acid which consists in bringing a mechanical mixture of carbon-monoxid and carbon-dioxid known as water-gas or producer-gas, in combination with alkaline hydrate, heating the same and producing a mechanical mixture of alkaline formate and carbonate of soda, then again heating the same to a greater degree of heat until the generation of hydrogen ceases, adding slaked lime and producing a mechanical mixture of calcium oxalate and calcium carbonate, reproducing alkaline hydrate, adding sulfuric acid and producing oxalic acid and calcium sulfate, substantially as set forth.

In testimony that I claim the invention set forth above I have hereunto set my hand this 6th day of December, 1904.

FREDERICK A. FELDKAMP.

Witnesses:
FREDK. C. FRAENTZEL,
GEO. D. RICHARDS.